March 28, 1933.   F. HENNIG   1,902,853
MEANS TO PREVENT DETACHMENT OF SPEEDOMETER
OR DISCONNECTION OF ITS DRIVE MEANS
Filed July 14, 1931
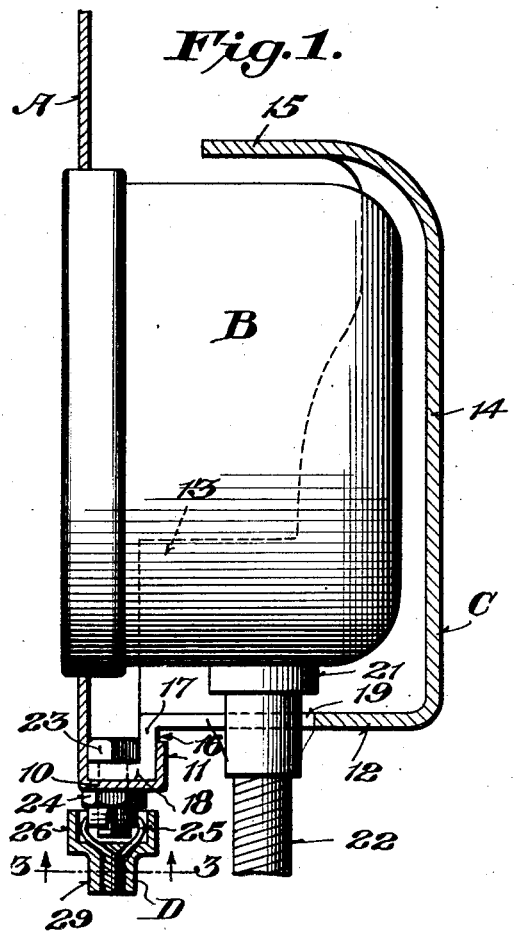
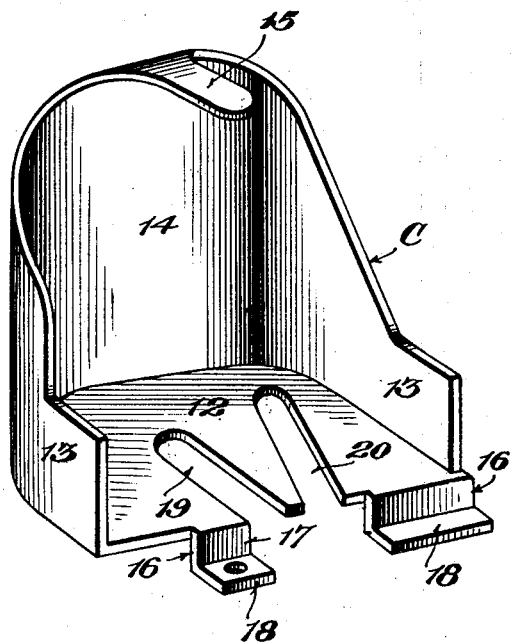
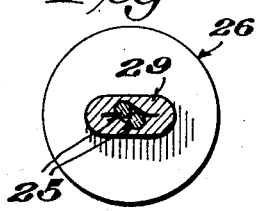
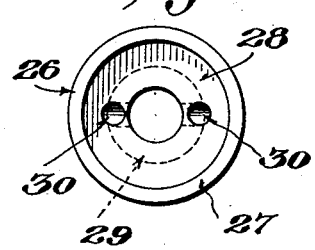
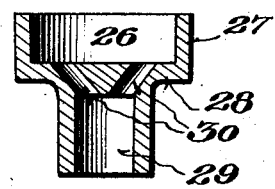
Inventor
Fred Hennig,
By D. P. Wolhaupter
Attorney Patented Mar. 28, 1933

1,902,853

UNITED STATES PATENT OFFICE

FRED HENNIG, OF PITTSBURGH, PENNSYLVANIA, ASSIGNOR TO PITTSBURGH TAXIMETER COMPANY, OF PITTSBURGH, PENNSYLVANIA, A CORPORATION

MEANS TO PREVENT DETACHMENT OF SPEEDOMETER OR DISCONNECTION OF ITS DRIVE MEANS

Application filed July 14, 1931. Serial No. 550,793.

As is well known, many concerns offer motor vehicles for hire on a mileage basis, and rely on the vehicle speedometer to indicate the number of miles travelled by any given vehicle in computing the charge for the use thereof.

In many instances dishonest persons hire motor vehicles on a mileage basis and detach the speedometer, or disconnect the drive means therefor, and travel many miles without any recording by the speedometer. Then, before the vehicle is returned to the concern hiring the same, the speedometer is reattached, or the drive connection therefor is reestablished, in order that it may appear that the vehicle has traveled only a limited number of miles when, as a matter of fact, the mileage actually covered by the vehicle during its period of hire may be far in excess of the mileage indicated by the speedometer. Thus, concerns offering vehicles for hire on a mileage basis are frequently defrauded of payment for many miles of actual vehicle travel.

Accordingly, the present invention has for its general object to provide means to render difficult the detachment of a speedometer, or the disconnection of the drive means therefor, thus to discourage the dishonest practice mentioned; and also to provide means whereby, in the event the speedometer is detached, or the drive means therefor is disconnected, an indication of such act is afforded. In other words, according to the present invention, it is practically impossible to detach a speedometer or to disconnect the drive means therefor without detection.

In accordance with the invention a cover is secured in enclosing relation to the speedometer and a seal is provided for the cover securing means, whereby it is necessary to destroy the seal in order to effect removal of the cover to permit detachment of the speedometer. In this connection the invention contemplates the use of a tamperproof meter speedometer drive means of the type disclosed in my prior application, serially numbered 522,771, filed March 14, 1931, and the present cover is designed to prevent access to the usual nut employed in such drive means to connect the flexible drive element thereof with the speedometer, whereby disconnection of the drive means cannot be effected without destroying the cover seal and removing the cover from its position enclosing the speedometer. Also, in this connection, an object of the invention is to provide a cover of simple, inexpensive construction to enclose the speedometer and the nut referred to; to provide for securing the cover in enclosing relation to the speedometer in a simple yet firm and efficient manner; and to provide a seal of simple, inexpensive and efficient character for the cover securing means.

With the foregoing and other objects in view, which will become more fully apparent as the nature of the invention is better understood, the same consists in the novel features of construction, combination and arrangement of parts as will be hereinafter more fully described, illustrated in the accompanying drawing and defined in the appended claims.

In the drawing, wherein like characters of reference denote corresponding parts in the different views:—

Figure 1 is a vertical sectional view showing a speedometer mounted on an instrument board and the present cover secured and sealed in enclosing relation thereto.

Figure 2 is a perspective view of the cover.

Figure 3 is a detail section on the line 3—3 of Fig. 1.

Figure 4 is an end view of the seal element; and

Figure 5 is a central section through the seal element.

Referring to the drawing in detail, A designates a portion of the instrument board or other part of a motor vehicle affording a speedometer support, B designates a speedometer mounted in the usual manner upon said support at the rear thereof with its face exposed to view through an opening in the support, and C designates, generally, the present speedometer cover.

In accordance with general practice the instrument board A is flanged laterally inward at its bottom, as at 10 and then upwardly as at 11, whereby it is reinforced and stiffened, and in accordance with the invention a portion or portions of the cover C is or are shaped to seat in the channel formed at the bottom of the instrument board by the flanges 10 and 11, whereby the cover is held firmly in enclosing relation to the speedometer.

As shown, the cover C which is open at its front, is inclusive of a bottom wall 12, side and rear walls 13 and 14, respectively, rising therefrom, a partial top wall 15 which may consist simply of a tongue directed inwardly from the top of the rear wall 14 to overlie the speedometer, and a foot element or elements 16 formed at the front of the bottom wall 12 and constituting the portions of the cover aforementioned for cooperation with the channel at the bottom of the instrument board to hold the cover in firm relation thereto.

In the present instance the cover C is illustrated as being provided with two of the foot elements 16 disposed in spaced relation to each other along the forward edge of the bottom wall 12 thereof, each of said elements consisting of a flange 17 extending downwardly from said edge and a flange 18 constituting a forwardly directed extension at the bottom of the flange 17.

Formed in the bottom wall 12 of the cover C is a pair of slots 19 and 20 to accommodate the drive connection and the usual manually operable resetting stem of the speedometer, respectively, when the cover is disposed in enclosing relation to the speedometer, these slots opening through the front edge of the bottom wall whereby the cover is adapted for forward movement from a position behind the speedometer to its operative position in enclosing relation thereto.

In mounting the cover in enclosing relation to the speedometer the cover is, as aforesaid, first positioned behind the speedometer with the slots 19 and 20 alined with the drive connection and the resetting stem, respectively, and the cover then moved forwardly and downwardly to its operative position with the foot elements 16 seated in the channel at the bottom of the instrument board. In this position of the cover detachment of the speedometer from the instrument board obviously is prevented, as also is access to the nut 21 connecting the drive shaft 22 with the speedometer because of the location of said nut between the bottom of the speedometer and the bottom wall 12 of the cover. It thus follows that when the cover is secured and sealed in its operative position, detachment of the speedometer, or disconnection of its drive means, is prevented except by breaking the seal of the cover securing means, which affords a ready means of detection of tempering with the speedometer or its drive connection.

The cover securing means comprises a bolt 23 inserted downwardly through alined openings in the flange 18 of one of the foot elements 16 and in the flange 10 of the support A, respectively, and equipped at its lower end with a nut 24 adapted to be drawn tightly against the bottom face of the flange 10 to clamp the cover to the support. The nut is of the castellated type or is otherwise suitably provided with one or more transverse openings for alinement with a transverse opening in the bolt 23 to receive a wire 25 to prevent removal of the nut from the bolt, while to prevent removal of the wire, a seal element D as illustrated in Figs. 4 and 5 is provided.

The seal element D is formed from lead or other relatively soft metal and comprises a cup portion 26 having side and bottom walls 27, 28, respectively, and a tubular portion 29 extending downwardly from the bottom wall of the cup portion, the said bottom wall having formed therethrough a pair of openings 30, 30 opening at their upper ends into the cup portion 26 and at their lower ends into the tubular portion 29.

One of the main purposes of the seal D is to cover all of the exposed wire parts 25 and thus make it difficult to locate them. That is to say, the seal constitutes a mask or cover for completely sealing the wire 25 as it hangs from the nut and bolt, and thus effectively prevents the cutting of the wire to remove the seal without damaging the wire.

After threading of the nut 24 onto the bolt 23 and passing of the wire 25 through the alined openings in the nut and bolt, the wire terminals are inserted in the openings 30 of the seal element and the latter moved upwardly until the cup portion 26 thereof is disposed in surrounding relation to the nut. The wire terminals then are twisted together within the tubular portion 29 of the seal element and finally, by means of a suitable tool or implement, the said tubular portion 29 is crushed upon the twisted ends of the wire whereby the securing means for the cover C is effectively sealed. Thus, breaking of the seal is necessary to permit detachment of the speedometer or disconnection of its drive means. Therefore, detaching of the speedometer or disconnection of its drive means is discouraged, and if the speedometer is detached, or its drive means disconnected, the invention affords a ready means of determining that such an act has been committed.

According to my aforementioned application, Serial No. 522,771, it is impossible to disconnect the drive shaft from a meter or speedometer without first removing the nut corresponding to the present nut 21, and since it is understood that a drive means similar to the drive means illustrated in my prior application is used in connection with the cover C, and that the latter prevents access to the nut 21, it follows that disconnection of the drive means for the speedometer B cannot be effected as long as the cover C remains in enclosing relation to the speedometer.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. In combination, a support having a channel formation, a device mounted on said support, a cover disposed in enclosing relation to the device and provided with a formation seated in the channel formation of the support to hold the cover firmly with respect to the support, and means for fastening the cover to the support.

2. In combination, a support having a channel formation, a device mounted on said support, a cover disposed in enclosing relation to the device, a foot formation on the cover formed to fit in the channel formation of the support to hold the cover firmly with respect to the support, and a bolt extending through said foot formation and a wall of said channel formation and provided with a nut to fasten the cover to the support.

3. In combination, a support having a channel formation, a device mounted on said support, a cover disposed in enclosing relation to the device and provided with a formation seated in the channel formation of the support to hold the cover firmly with respect to the support, the device having an element extending therefrom to the outside of the cover, and the cover having a slot to accommodate said element, said slot opening through an edge of the cover to permit facile operative engagement of the cover with the support in enclosing relation to the device.

4. In combination, a substantially vertical support formed at its bottom with an upwardly opening channel formation, a device mounted on said support above said channel formation, and a cover disposed in enclosing relation to said device, said cover having side, top, bottom and rear walls and being open at its front to adapt it to be readily placed in enclosing relation to the article, retaining formations on the front bottom portion of the cover fitting closely within the channel formation of the support, and means for fastening the cover to the support.

In testimony whereof I hereunto affix my signature.

FRED HENNIG.